United States Patent Office 3,147,247
Patented Sept. 1, 1964

3,147,247
DERIVATIVES OF 6-AMINO PENICILLANIC ACID
Alfred W. Chow, Merchantville, N.J., assignor to Smith
Kline & French Laboratories, Philadelphia, Pa., a corporation of Pennsylvania
No Drawing. Filed June 26, 1962, Ser. No. 205,209
5 Claims. (Cl. 260—239.1)

This invention relates to new compositions of matter having valuable therapeutic utility and more specifically to new penicillin compounds and processes for their preparation.

The compounds of this invention may be represented by the following formula:

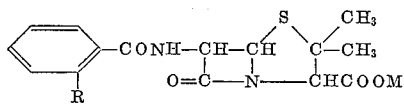

in which R is a cycloalkyl group of from about 5 carbon atoms to about 7 carbon atoms and M is a pharmaceutically acceptable nontoxic cation such as hydrogen, sodium, potassium, calcium, aluminum or organic amines. Such amines include triethylamine, N-ethylpiperidine, benzanthine, hydrobamine and the like.

The preferred species of the group R is cyclohexyl; however cyclopentyl and cycloheptyl as well as the mono-unsaturated analogs demonstrated similar properties. Furthermore these 6 - (o - cycloalkylbenzamido) - penicillanic acid derivative may be substituted in the phenyl ring and/or the cycloalky ring by such groups as chlorine, bromine, fluorine, trifluoromethyl, methyl, ethyl, propyl, methoxy, ethoxy, amino, dialkylamino, nitro and the like. It is to be appreciated however, that each of these variations does not substantially alter the fundamental nuclear structure which imparts the novel properties to these compounds and which is the heart of this invention.

The compounds of this invention have anti-microbial activity as is found in many other penicillin compounds. For example, the spectrum of these compounds embraces those of penicillin G and penicillin V as against the "penicillin-susceptible" Gram positive microorganisms. In addition however, these compounds are also effective antimicrobial agents against "penicillin-resistant" staphylococcus, being equivalent or superior in this respect to 2,6-dimethoxyphenylpenicillin and 3 - methyl-5-phenylisoxazolepenicillin, the two penicillins currently employed against such organism. This finding is totally unexpected since generally those penicillins active against susceptible organisms do not possess a therapeutically useful level of activity against the resistant organisms and visa-versa. Moreover the compounds of the present invention demonstrate pharmacological properties superior to many of the penicillin now known. Hence in addition to the broad antimicrobial spectrum of these compounds described above, these compounds are active upon oral administration and exhibit serum levels which are higher than penicillin V.

These compounds are combined with a pharmaceutical carrier in a dosage unit form containing an effective amount of the compound then administered internally, preferably orally or parenterally to hosts infected with pathological microorganisms susceptible to the compounds of this invention as noted above.

These compounds are prepared by acylation of 6-aminopenicillanic acid. For this acylation, o-cyclohexylbenzoic acid is employed in the form on an acid halide such as an acid chloride or acid bromide. Alternatively a mixed anhydride or acid anhydride may be advantageously employed as a salt such as the sodium or triethylamine salt in an aqueous solution and the acylation executed in water miscible solvent such as acetone.

The resultant 6-(2-cyclohexylbenzamido)-penicillanic acid is isolated by evaporation, or precipitation, generally as a salt and this salt may be converted into other non-toxic pharmaceutically acceptable by conversion to the free acid followed by treatment with an appropriate base.

The following example will serve to typify a method of preparing the compounds of this invention. While these procedures are directed towards the preparation of the unsubstituted cyclohexylbenzamido penicillanic acid and its salts, it is to be appreciated that they are equally applicable to the various substituted analogs thereof as well as to the cyclopentyl and cycloheptyl compounds described above. Thus these procedures are intended solely as an exemplification and not as a limitation of this invention.

*Preparation of o-cyclohexylbenzoic acid*

To a solution of 19.8 g. (0.1 mole) of o-phenylbenzoic acid in 100 ml. of glacial acetic acid is added 1.5 g. of platinum oxide. The mixture is hydrogenated on a Parr shaker until 0.3 mole of hydrogen are absorbed (about 5 hours). The platinum catalyst is removed by filtration and the filtrate concentrated to an oil. This oil is extracted with a 5% aqueous sodium bicarbonate solution and these bicarbonate extracts are then rendered acidic by the addition of concentrated hydrochloric acid. The solid which forms is collected by filtration and combined with addition material obtained by extraction of the mother liquid with ether. The combined solids are dissolved in 60 ml. of cold concentrated sulfuric acid and stirred 75 minutes, after which time the solution is poured into 750 ml. of ice water. The supernatant solution is then decanted and the solid which forms is thoroughly extracted with a 5% aqueous sodium bicarbonate solution. These bicarbonate extracts are acidified and filtered to yield o-cyclohexylbenzoic acid. Upon recrystallization from petroleum ether, this material demonstrates a melting point of 105–107° C.

*Preparation of o-Cyclohexylbenzoyl Chloride*

A solution of 4.1 g. (0.0201 mole) of o-cyclohexylbenzoic acid in 25 ml. of thionyl chloride is held at room temperature for five hours. The excess thionyl chloride is then evaporated under reduced pressure and the residual oil evaporated twice with dry benzene and dried to yield o-cyclohexylbenzoylchloride.

*Preparation of 6-(2-Cyclohexylbenzamido)-Penicillanic Acid*

A stirred solution of 21.6 g. (0.1 mole) of 6-aminopenicillanic acid in 950 ml. of 3% sodium bicarbonate and 600 ml. of acetone is chilled to −15° and a solution of 22.3 g. (0.1 mole) of the acid chloride in 350 ml. of acetone is added over a 35 minute period, maintaining a temperature of about −15°. Stirring at this temperature is continued for one hour and the reaction mixture is then allowed to attain room temperature, at which temperature it is stirred for 2.5 hours. The reaction mixture is then extracted twice with one liter portions of ether and the residual aqueous phase chilled to 0° and covered with 500 ml. of ether. The pH is next adjusted to 2.0 with 6 N sulfuric acid and the organic phase separated. The aqueous phase is again extracted with 350 ml. of ether and the combined ethereal solutions washed with 250 ml. of water and dried over anhydrous magnesium sulfate. The dried ethereal solution is then evaporated in vacuo at low temperature to a gum which upon the addition of a small amount of methanol crystallized. The solid is suspended in 250 ml. of methanol, cooled to 5° and titrated with a saturated solution of sodium methoxide in methanol to pH 7.0. Three volumes of isopropyl ether are added and the precipitated sodium salt is collected by filtration and dried. The sodium salt is dissolved in a minimum amount of methanol and to the solution is added three volumes of ether. Upon cooling, the solid which forms is collected by filtration and dried to yield the sodium salt of 6-(2-cyclohexylbenzamido)-penicillanic acid, M.P. 174–182° (dec.). Calc. (for 1.5 H$_2$O): C, 55.86; H, 6.26; N, 6.21. Found: C, 55.79; H, 6.29; N, 6.31.

The sodium salt is treated with acid and the solution then extracted with ether to yield the free acid. This acid is then treated according to the accepted methods of the art with an appropriate base such as triethylamine, calcium hydroxide, potassium carbonate or the like to form the corresponding pharmaceutically acceptable non-toxic salts.

I claim:
1. A compound of the formula:

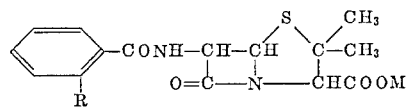

wherein R is a cyclohexyl group and M is a cation selected from the group consisting of hydrogen, sodium, potassium, calcium, aluminum, triethylamine, N-ethylpiperidine, benzanthine, and hydrobamine.
2. 6-(2-cyclohexylbenzamido)-penicillanic acid.
3. Sodium 6-(2-cyclohexylbenzamido)-penicillanate.
4. Potassium 6-(2-cyclohexylbenzamido)-penicillanate.
5. Triethylammonium - 6 - (2 - cyclohexylbenzamido)-penicillanate.

References Cited in the file of this patent
UNITED STATES PATENTS
2,951,839    Doyle et al. _____ Sept. 6, 1960